(12) United States Patent
Morris

(10) Patent No.: US 7,593,984 B2
(45) Date of Patent: Sep. 22, 2009

(54) SYSTEM AND METHOD FOR HARMONIZING CHANGES IN USER ACTIVITIES, DEVICE CAPABILITIES AND PRESENCE INFORMATION

(75) Inventor: Robert P. Morris, Raleigh, NC (US)

(73) Assignee: Swift Creek Systems, LLC, Portsmouth, NH (US)

( * ) Notice: Subject to any disclaimer, the term of this patent is extended or adjusted under 35 U.S.C. 154(b) by 115 days.

(21) Appl. No.: 10/903,576

(22) Filed: Jul. 30, 2004

(65) Prior Publication Data

US 2006/0030264 A1 Feb. 9, 2006

(51) Int. Cl.
*G06F 15/16* (2006.01)
*G06F 15/173* (2006.01)

(52) U.S. Cl. ............... 709/203; 709/204; 709/206; 709/223; 709/224

(58) Field of Classification Search ......... 709/203–204, 709/206, 223–224
See application file for complete search history.

(56) References Cited

U.S. PATENT DOCUMENTS

| | | | |
|---|---|---|---|
| 5,893,083 A | 4/1999 | Eshghi et al. | |
| 5,963,913 A | 10/1999 | Henneuse et al. | 705/9 |
| 6,148,328 A | 11/2000 | Cuomo et al. | 709/204 |
| 6,353,660 B1 | 3/2002 | Burger et al. | |
| 6,430,604 B1 | 8/2002 | Ogle et al. | 709/207 |
| 6,549,939 B1 | 4/2003 | Ford et al. | 709/217 |
| 6,654,790 B2 | 11/2003 | Ogle et al. | 709/206 |
| 6,668,167 B2 * | 12/2003 | McDowell et al. | 455/412.1 |
| 6,668,173 B2 | 12/2003 | Greene | 455/445 |
| 6,754,904 B1 | 6/2004 | Cooper et al. | 725/32 |
| 6,757,722 B2 | 6/2004 | Lonnfors et al. | |
| 6,799,196 B1 | 9/2004 | Smith | |
| 6,839,735 B2 | 1/2005 | Wong et al. | |
| 6,839,737 B1 | 1/2005 | Friskel | |
| 6,853,634 B1 | 2/2005 | Davies et al. | |
| 6,961,765 B2 | 11/2005 | Terry | |
| 7,035,923 B1 * | 4/2006 | Yoakum et al. | 709/224 |
| 7,111,044 B2 | 9/2006 | Lee | |
| 7,139,554 B2 | 11/2006 | Litwin | |
| 7,139,797 B1 * | 11/2006 | Yoakum et al. | 709/204 |
| 7,177,928 B2 | 2/2007 | Sasaki et al. | |
| 7,184,524 B2 | 2/2007 | Digate et al. | |
| 7,219,303 B2 | 5/2007 | Fish | |
| 7,246,371 B2 | 7/2007 | Diacakis et al. | |
| 7,251,482 B2 * | 7/2007 | Ackermann-Markes | 455/414.1 |

(Continued)

OTHER PUBLICATIONS

Day, M. et al., Instant Messaging/Presence Protocol Requirements, Feb. 2000, www.ietf.org/rfc/rfc2779.txt, 25 pages.

(Continued)

*Primary Examiner*—Nathan J Flynn
*Assistant Examiner*—Joshua Joo

(57) ABSTRACT

A method and system utilizes presence information in a device. The method and system include detecting at least one of a change in the status for the user or a change in an activity associated with a capability of the device. The detection of the activity change includes a second device communicating the activity change with a presence service. The method and system also include automatically altering the capability of the device if the change in the status is detected or automatically altering the status if the change in the activity is detected.

19 Claims, 4 Drawing Sheets

U.S. PATENT DOCUMENTS

| | | | |
|---|---|---|---|
| 7,263,545 B2 | 8/2007 | Digate et al. | |
| 7,269,162 B1 | 9/2007 | Turner | |
| 7,334,021 B1 | 2/2008 | Fletcher | |
| 7,412,522 B2 | 8/2008 | Liscano et al. | |
| 7,444,379 B2* | 10/2008 | Becker et al. | 709/206 |
| 2002/0026505 A1 | 2/2002 | Terry | |
| 2002/0116461 A1 | 8/2002 | Diacakis et al. | |
| 2002/0120687 A1 | 8/2002 | Diacakis et al. | |
| 2002/0120774 A1 | 8/2002 | Diacakis | |
| 2002/0130904 A1 | 9/2002 | Becker et al. | 715/753 |
| 2002/0184089 A1* | 12/2002 | Tsou et al. | 705/14 |
| 2003/0009530 A1 | 1/2003 | Philonenko et al. | 709/206 |
| 2003/0018726 A1 | 1/2003 | Low et al. | |
| 2003/0043190 A1 | 3/2003 | Bernius et al. | 345/753 |
| 2003/0119540 A1 | 6/2003 | Mathis et al. | |
| 2003/0154293 A1 | 8/2003 | Zmolek | |
| 2003/0182428 A1 | 9/2003 | Li et al. | 709/227 |
| 2003/0200268 A1 | 10/2003 | Morris | 709/206 |
| 2003/0217098 A1 | 11/2003 | Bobde et al. | |
| 2003/0217109 A1 | 11/2003 | Ordille et al. | |
| 2003/0236086 A1* | 12/2003 | Litwin, Jr. | 455/412.1 |
| 2003/0236830 A1 | 12/2003 | Ortiz et al. | 709/204 |
| 2004/0003090 A1 | 1/2004 | Deeds | 709/227 |
| 2004/0015553 A1 | 1/2004 | Griffin et al. | |
| 2004/0098491 A1 | 5/2004 | Costa-Requena et al. | |
| 2004/0109197 A1 | 6/2004 | Gardaz et al. | 358/1.15 |
| 2004/0122896 A1 | 6/2004 | Gourraud | 709/206 |
| 2004/0153506 A1 | 8/2004 | Ito et al. | 709/204 |
| 2004/0162881 A1 | 8/2004 | Digate et al. | |
| 2004/0172455 A1 | 9/2004 | Green et al. | 709/207 |
| 2004/0177116 A1 | 9/2004 | McConn et al. | 709/204 |
| 2004/0183829 A1 | 9/2004 | Kontny et al. | 715/758 |
| 2004/0201668 A1 | 10/2004 | Matsubara et al. | |
| 2004/0205134 A1 | 10/2004 | Digate et al. | |
| 2004/0243941 A1 | 12/2004 | Fish | 715/752 |
| 2004/0267887 A1 | 12/2004 | Berger et al. | |
| 2005/0004984 A1 | 1/2005 | Simpson | 709/205 |
| 2005/0004985 A1 | 1/2005 | Stochosky | 709/205 |
| 2005/0004995 A1 | 1/2005 | Stochosky | 709/219 |
| 2005/0021624 A1 | 1/2005 | Herf et al. | 709/204 |
| 2005/0027805 A1 | 2/2005 | Aoki | 709/206 |
| 2005/0039134 A1 | 2/2005 | Wiggeshoff et al. | 715/752 |
| 2005/0071426 A1* | 3/2005 | Shah | 709/204 |
| 2005/0071428 A1 | 3/2005 | Khakoo et al. | |
| 2005/0080848 A1* | 4/2005 | Shah | 709/204 |
| 2005/0086309 A1 | 4/2005 | Galli et al. | 709/206 |
| 2005/0108347 A1 | 5/2005 | Lybeck et al. | |
| 2005/0135240 A1 | 6/2005 | Ozugur | |
| 2005/0213609 A1 | 9/2005 | Brusilovsky et al. | |
| 2006/0004911 A1* | 1/2006 | Becker et al. | 709/207 |
| 2006/0004921 A1* | 1/2006 | Suess et al. | 709/227 |
| 2006/0036712 A1 | 2/2006 | Morris | |
| 2006/0135182 A1* | 6/2006 | Unmehopa | 455/456.6 |
| 2006/0190117 A1* | 8/2006 | Weczorek et al. | 700/103 |
| 2006/0224688 A1 | 10/2006 | Morris | |
| 2006/0248185 A1 | 11/2006 | Morris | |
| 2007/0288580 A1* | 12/2007 | Kaminsky et al. | 709/206 |
| 2008/0046510 A1 | 2/2008 | Beauchamp et al. | |
| 2008/0046556 A1 | 2/2008 | Nicholls et al. | |
| 2008/0242231 A1* | 10/2008 | Gray | 455/66.1 |
| 2008/0294772 A1* | 11/2008 | Hagale et al. | 709/224 |

OTHER PUBLICATIONS

Day, M. et al., "A Model for Presence and Instant Messaging," Feb. 2000, www.ietf.org/rfc/rfc2778.txt, 16 pages.

Saint-Andre, Peter, "Extended Presence Protocol Suite," www.jabber.org/jeps/jep-0119.html, 10 pages.

Saint-Andre, Peter, "Presence Obtained via Kinesthetic Excitation (POKE)," www.jabber.org/jeps/jep-0132.html, 10 pages.

Sugano, H. et al, Presence Information Data Format (PIDF), Aug. 2004, http://www.ietf.org/rfc/rfc3863.txt, 27 pages.

U.S. Appl. No. 10/960,135, Robert P. Morris, filed Oct. 6, 2004.

U.S. Appl. No. 10/960,365, Robert P. Morris, filed Oct. 6, 2004.

* cited by examiner

SYSTEM AND METHOD FOR HARMONIZING CHANGES IN USER ACTIVITIES, DEVICE CAPABILITIES AND PRESENCE INFORMATION

CROSS-REFERENCE TO RELATED APPLICATIONS

The present application is related to co-pending U.S. patent application Ser. No. 10/960,365, entitled "SYSTEM AND METHOD FOR UTILIZING CONTACT INFORMATION, PRESENCE INFORMATION AND DEVICE ACTIVITY," filed concurrently herewith, and assigned to the assignee of the present application. The present application is related to co-pending U.S. patent application Ser. No. 10/900,558, entitled "SYSTEM AND METHOD FOR PROVIDING AND UTILIZING PRESENCE INFORMATION," filed on Jul. 28, 2004, and assigned to the assignee of the present invention.

FIELD OF THE INVENTION

The present invention relates to instant messaging services and more particularly to providing and utilizing presence information on a client, particularly a multiple user device.

BACKGROUND OF INVENTION

Instant messaging services provide a well known mechanism for allowing computer users to communicate online for example by sending a message or chatting with another user. Such services are typically provided by AOL, MSN, Yahoo, and other similar service providers. Certain data associated with a user of such instant messaging services is known as presence information. Presence information typically consists of one or more presence tuples, which represent the status, an optional activity address, and other information relating to the user. The status of the user can simply be open or closed, when the computer system will or will not accept instant messages for the user. Other examples of the status of the user can include "online", "away from my desk", "stepped out", or "on the phone". Based on the status of a user, other users may decide whether to initiate activities with the user. Contact information can include contact addresses such as email address, ftp addresses, or postal addresses. More information on instant messaging and presence information can be found in Request for Comment (RFC) 2778, RFC 2779, and Jabber Enhancement Proposal (JEP 0119).

As part of instant messaging services, a conventional friends list is often supported. Such a conventional friends list provides a user with presence information related to other entities (e.g. other users of the instant messaging service) who are associated with the user. More specifically, status information for the "friends" is provided in the friends list. For example, while a user is online, the conventional friends list is typically displayed in a window on the user's display. Using the friends list, a user can determine whether to send a message to an entity on the friends list. For example, if a particular friend's status is "busy" or "away from my desk," the user may opt not to attempt to start a chat session with that particular friend.

Moreover, instant messaging allows limited association between the actions that a user is taking and the status of the user. More particularly, some conventional instant messaging applications that reside on the device have internet radios incorporated into the application. When a user plays the radio, the conventional instant messaging application notes that the internal radio is being used and alters the user's status, for example to "busy". Similarly, some conventional instant messaging applications take note of activity on a keyboard for the device. The instant messaging application monitors the activity on the keyboard for the device on which the instant messaging application resides. If the keyboard is not used for a period of time the instant messaging application may change the user's status to "idle".

Although conventional instant messaging services and conventional friends lists are useful, one of ordinary skill in the art will readily recognize that there are significant drawbacks to such conventional instant messaging services. In particular, there is no requirement that another instant messaging user respect the status of another user. For example, suppose a first user has a friends list including a second user. The second user's status is listed as "busy" or "away from my desk". However, the first user may still attempt to communicate with the second user, for example by calling or initiating a chat session. The second user will still receive the call or the message indicating that the first user has initiated a communication. The second user may, therefore, still be distracted by the communication. Such distractions may be annoying or, in the case where the second user is engaged in an activity such as driving a car, even dangerous. Furthermore, a user may forget to change their status when engaging in an activity, including activities involving other devices. For example, a user may be on the phone, driving a car, or otherwise busy, but forget to change their status to "busy". As a result, others having access to the user's status may not realize that the user is busy and attempt to contact the user. Again, the communication may prove to be distracting, annoying, and even dangerous. Thus, despite the use of presence information, there are drawbacks to conventional instant messaging services.

Accordingly, what is needed is a method and system for improving communications between instant messaging service users based upon the status information. The present invention addresses such a need.

BRIEF SUMMARY OF THE INVENTION

The present invention provides a method and system for utilizing presence information for a device. The method and system comprise detecting at least one of a status change in the status for the user and an activity change in an activity associated with a capability of the device. The detection of the activity change includes a second device communicating the activity change with a presence service. The method and system also comprise automatically altering the capability of the device if the change in the status is detected or automatically altering the status if the change in the activity is detected.

According to the method and system disclosed herein, the present invention allows the status information to be updated based upon a change in the user's activities, or the capabilities of the device to be updated based upon a change in the status.

DETAILED DESCRIPTION OF THE INVENTION

The present invention relates to instant messaging services. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for utilizing presence information for a device. The method and system comprise detecting at least one of a status change in a status for the user and an activity change in an activity associated with a capability of the device. The detection of the activity change includes a second device communicating the activity change with a presence service. The method and system also comprise automatically altering the capability of the device if the change in the status is detected or automatically altering the status if the change in the activity is detected.

The present invention will be described in terms of a particular method having certain steps. However, one of ordinary skill in the art will readily recognize that a method in accordance with the present invention can include other and/or additional steps not inconsistent with the present invention. Similarly, the present invention will be described in terms of particular devices, such as cellular or other telephones and digital cameras. However, one of ordinary skill in the art will readily recognize that the method and system in accordance with the present invention can include other and/or additional components not inconsistent with the present invention. The present invention will also be described in terms of a single capability, a single activity, and a particular status. However, one of ordinary skill in the art will readily recognize that the method and system apply to multiple capabilities, multiple activities, and multiple statuses.

Figure 1:
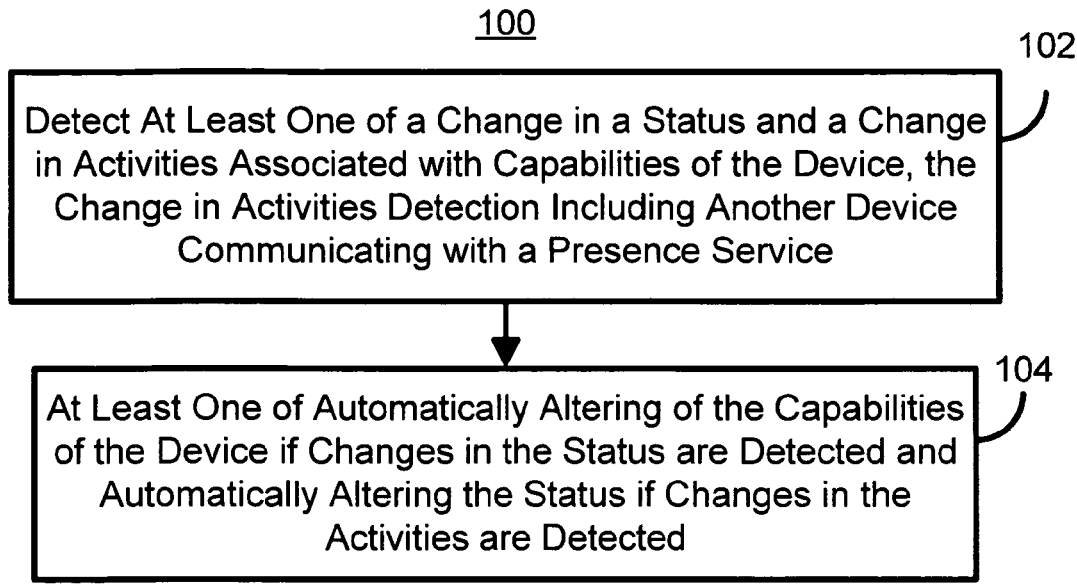
FIG. 1 is a high-level flow chart of one embodiment of a method in accordance with the present invention for harmonizing status, user activities, and device capabilities using presence information.

FIG. 1 is a high-level flow chart of one embodiment of a method 100 in accordance with the present invention for harmonizing status, user activities, and capabilities of a device using presence information. In one embodiment, the device is a telephone having data capabilities. In alternate embodiment, the device might be a digital imaging device such as a digital camera, a personal computer, a laptop computer, or other device having data capabilities. In one embodiment, the method 100 commences after the user has already provided their identity, particularly for a device that has multiple users. The method 100 also preferably starts after presence information, such as the user's status, has been provided to a presence service that is preferably analogous to an instant messaging service. At least one of a change in a status for the user and a change in activities associated with capabilities of the device is detected, via step 102. The capability with which the activities or status is associated is preferably one which relates to communication using the device. In step 102, detection of the change in activity includes a second device communicating the activity change with a presence service. Thus, the change in activity is not detected directly by the device for which the status may be altered. Instead, the second device with which the activity is associated informs the presence service of the activity change or initiation. Also in a preferred embodiment, the presence service then updates the device as to the change in the activity. The activities may include being on the phone, away from the device, engaged in a chat session, capturing an image or video, driving an automobile or engaged in another activity that renders the user unable or unwilling to communicate using the device. Thus, the capabilities may include receiving an email message, sending an email message, receiving an incoming telephone call, or initiating a telephone call. However, the change in activity is not detected directly by the device to which the capabilities relate. Instead, the device is preferably informed of the change by the presence service. The change in status may include but is not limited to changing between "available" and statuses which indicate the user desires to be undisturbed such as "on the phone", "busy", or "away from the desk". The capabilities of the device are automatically altered if the change in the status is detected or the status is automatically altered if changes in the activities described above are detected, via step 104. Thus, the capabilities of the device may be altered to reflect changes in status or the status may be altered to reflect changes in activities affecting the capabilities of the device. In one embodiment, in response to the communication of the activity change from the second device, the presence service informs the device of the activity change. The device may then ensure that the status is changed. In an alternate embodiment, the presence service could change the status based on the communication from the second device, then inform the device of the change. In a further embodiment the second device which detects the activity updates the user status with the presence service which then informs the device. However, other mechanisms might be used. For example, if the device is a telephone and the status of the user changes from "available" to "on the phone", the capability of the user's instant messaging client running on a PC to receive messages may be disabled. In another example, if the user turns on a digital camera and sets it to capture mode, the users' status is updated to "taking a picture" or "busy". The capability of the user's phone to ring is disabled. The user's phone may be integrated into the same device as the user's camera or in a separate device. Similarly, if the user's status changes from driving a car (and thus "unavailable" for answering incoming messages on their cell phone) to no longer driving the car and thus "available", the capability of the telephone to ring in response to incoming calls may be enabled. Alternatively, if the user picks up a telephone linked to the user's computer, then the method 100 allows the computer to automatically alter the user's current status to "on the phone", preferably by sending a message to a presence service. In addition, once the method 100 is utilized for updating the status of a device based upon a change in the user's activities, the method 100 may then be used to alter the capabilities of that or another device based upon the change in status. The reverse is also true. Thus, using the method 100, the user's status, activities and the capabilities of the device may be harmonized.

Figure 2:
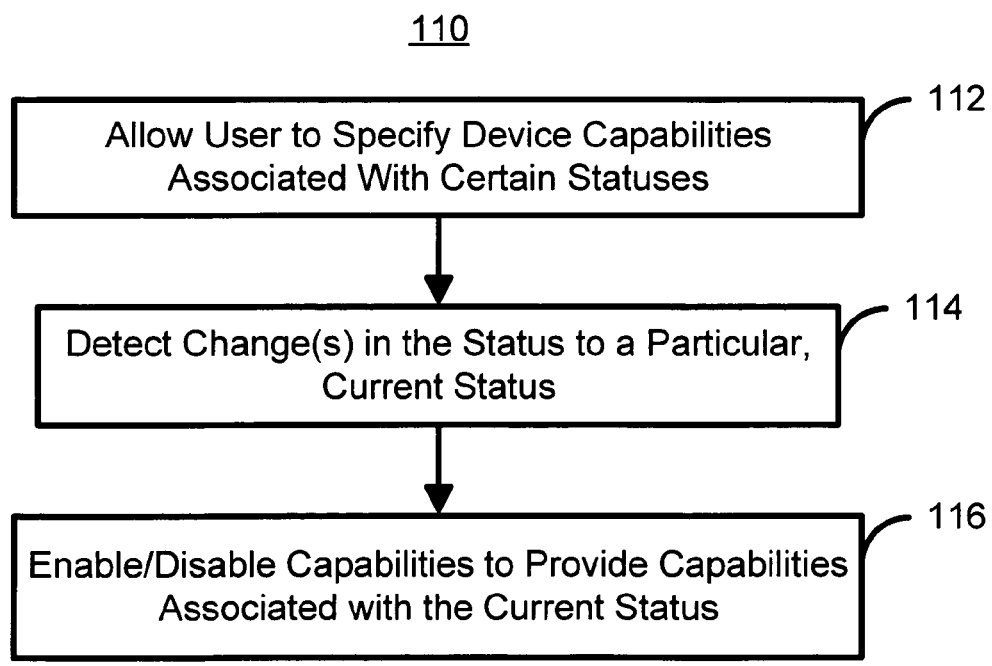
FIG. 2 is a high-level flow chart of another embodiment of a method in accordance with the present invention for updating device capabilities based upon a status change in the presence information for a user.

FIG. 2 is a high-level flow chart of another embodiment of a method 110 in accordance with the present invention for updating capabilities of a device based upon a status change in the presence information for a user. In one embodiment, the device is a telephone having data capabilities. In alternate embodiment, the device might be a digital imaging device such as a digital camera, a personal computer, a laptop computer, or other device having data capabilities. In one embodiment, the method 110 commences after the user has already provided their identity, particularly for a device that has multiple users. The method 110 also preferably starts after presence information, such as the user's status, has been provided to a presence service that is preferably analogous to an instant messaging service. The device has a number of capabilities. In a preferred embodiment, at least some of the capabilities relate to communication using the device. A user is allowed to specify a portion of the plurality of capabilities associated with a particular status, via step 112. For example, the capabilities associated with "on the phone" might include sending incoming telephone calls straight to voicemail, disabling the ringer on the phone, and accepting incoming email messages. Thus, step 112 may include specifying that certain capabilities are to be enabled while other capabilities are to be disabled for a particular status. Change(s) in the status for the user are detected, via step 114. Changes in status can be considered to be equivalent to a particular, new status becoming a current status of the user. Capabilities of the device are automatically enabled and/or disabled such that only the appropriate capabilities associated with the particular status of the user are enabled, via step 116.

Thus, using the method 110, the capabilities of the device are updated in response to a change in the user's status. For example, a user may change their status to "on the phone." Such a status change is detected in step 114. As a result, the capability of the device to receive instant messages, except those from a call participant, may be disabled in step 116. Similarly, a user may start their car, which is capable of updating the user's status to "not available." When starting the car, the user also preferably identifies themself, in one embodiment by using a unique key. The status of the user is updated, for example by the car sending a message to the presence service (not depicted in FIG. 2) indicating that the user's status is to be changed to "not available." As a result of the change in status, the capability of the user's mobile telephone to accept incoming calls and messages may be disabled in step 116. Consequently, the capabilities of the device are updated to reflect a change in the user's status. Thus, even if another entity chooses not to respect the user's status, such as "unavailable," the user need not be bothered by unwanted attempts at communication. Similarly, when a user is capturing an image or video, the capabilities of the user's phone and messaging client are altered so as not to disturb the activity. When status is combined with location, data devices in the vicinity of the user, such as a doorbell, may have their capabilities altered so as not to disturb the user's activity.

Figure 3:
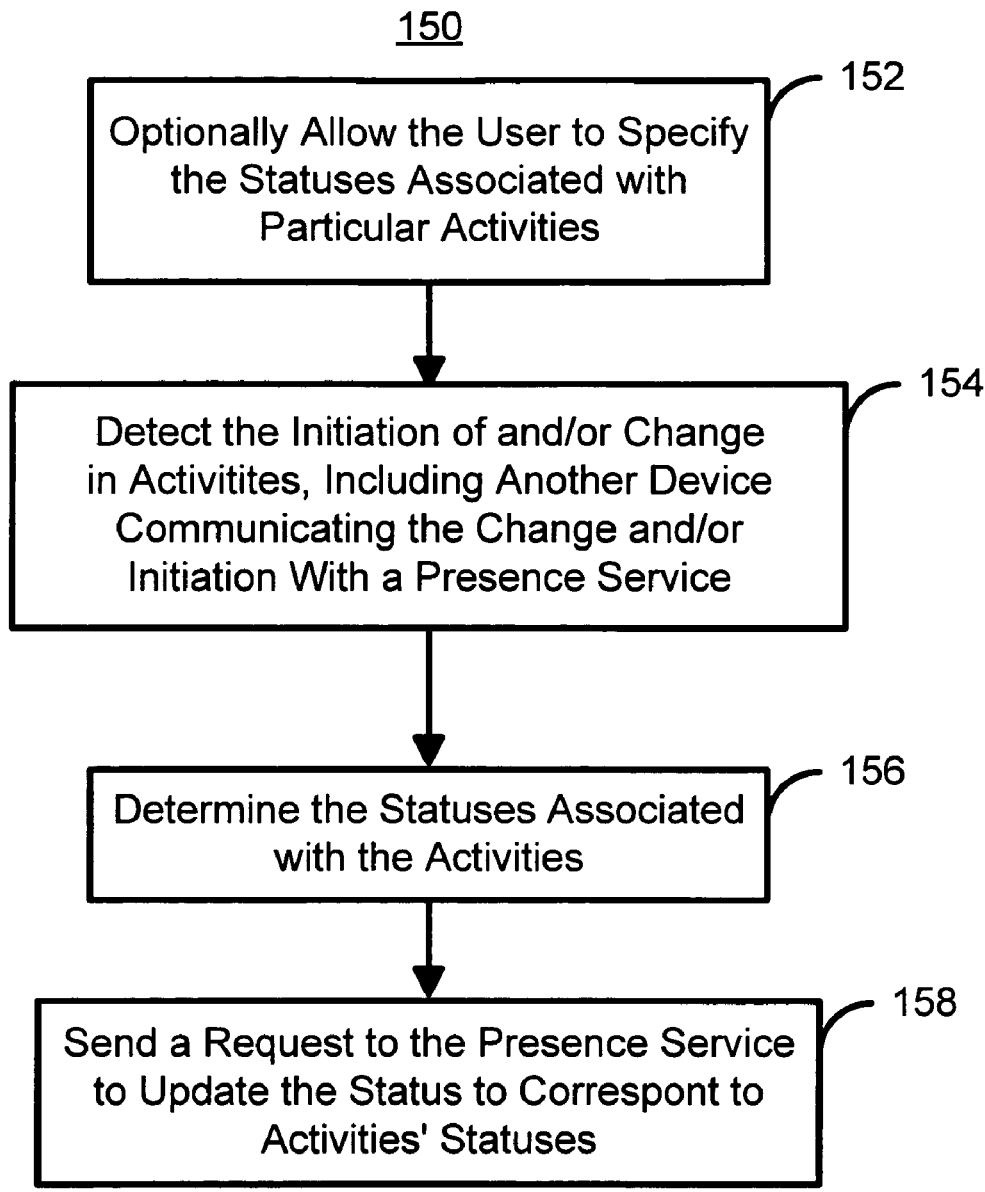
FIG. 3 is a more detailed flow chart of one embodiment of a method in accordance with the present invention for updating the presence information for a user based upon a change in activities of the user.

FIG. 3 is a more detailed flow chart of one embodiment of a method 150 in accordance with the present invention for updating the presence information for a user based upon a change in activities of the user that are associated with capabilities of a device. In one embodiment, the device is a telephone having data capabilities. In alternate embodiment, the device might be a digital imaging device such as a digital camera, a personal computer, a laptop computer, or other device having data capabilities. In one embodiment, the method 150 commences after the user has already provided their identity, particularly for a device that has multiple users. The method 150 also preferably starts after presence information, such as the user's status, has been provided to a presence service that is preferably analogous to an instant messaging service. The device has a number of capabilities. In a preferred embodiment, at least some of the capabilities relate to communication using the device.

The user may optionally be allowed to specify particular statuses associated with certain activities, via step 152. Note that in some embodiments, some activities may not be associated with a particular status. In some embodiments, the user may specify the status associated with some activities, while default statuses are associated with other activities. In other embodiments, the user may not be allowed to specify the status associated with a particular activity. Instead, the status associated with certain activities may be determined by another entity, such as the presence service (not depicted in FIG. 3). Thus, in an alternate embodiment, certain activities are associated with default statuses.

A change in the activities being carried out by the user and/or the initiation of certain activities by the user are detected, via step 154. The detection performed in step 154 includes the change and/or initiation of activities includes a second device communicating the change and/or initiation with a presence service. In some embodiments, an initiation of certain activities can be considered to be a subset of a change in these activities and, therefore, need not be separately detected. Thus, the user is now engaged in particular, current activities. In a preferred embodiment, these activities are associated with communication capabilities of a device. The particular status, if any, associated with the particular activity is determined, via step 156. Step 156 thus may include sending a query to the presence service indicating the current activity and receiving the status associated with the activity if such information is stored by the presence service. Alternatively, the device on which the activity is performed or the device with which the status is associated may be used to determine the status associated with the activity. The status for the user is allowed to be updated based on the particular activity, via step 158. In one embodiment, step 158 includes sending a request to a presence service to update the status in the presence information for the user.

Thus, using the method 150, the user's status is automatically updated in response to the initiation of or changes in activities of the user. For example, the method 150 might be used to update the user's status for a personal computer. The user may initiate a call on their mobile phone. The initiation of the call is detected in step 154, including the phone sending a notification to the presence service that a call has been initiated or requesting a status update associated with the current activity. In one embodiment, the presence service notifies other device(s), such as the personal computer, of the initiation of the call. The status associated with the call, in this case "on the phone", is determined in step 156. In one embodiment, the determination of the status associated with the activity may take place at the presence service or in the device. In the example above, the presence service might determine the status for the personal computer associated with the phone call or the personal computer may determine its status associated with the call. The device sends a request to the presence service to alter the user's status to "on the phone" in step 158. Thus, the personal computer may send a request to the presence service to have the user's status updated to "on the phone." Similarly, a user may enter their car and start the car using a unique key identifying the user. The change in activities, driving a car, is detected in step 154. The car thus sends a message to the presence service that the user is driving the car. The status associated with driving a car, for example "not available", is determined in step 156. The presence service is accessed to change the user's status to "not available" or another status for a device, such as a personal computer or cell phone. In another example, the user may change the mode of a camera, the second device described above, to capture mode. The camera detecting this change in step 154 determines the user's status associated with image capture activity is "busy" in step 156. The camera accesses the presence service and updates the user's status to "busy". This status is communicated to another device, such as a cell phone. Alternatively, the camera accesses the presence service and communicates the change in activity. The presence service communicates the activity change to the cell phone, which ensures that the status is changed to "busy". Moreover, the methods 110 and 150 may be combined. As a result, once the status is updated as described above, the capabilities of one or more of the device(s) associated with the user may be selectively enabled and/or disabled based upon the new status. Thus, the user's status, the user's activities, and the capabilities of the device(s) the user employs may be harmonized.

Figure 4:
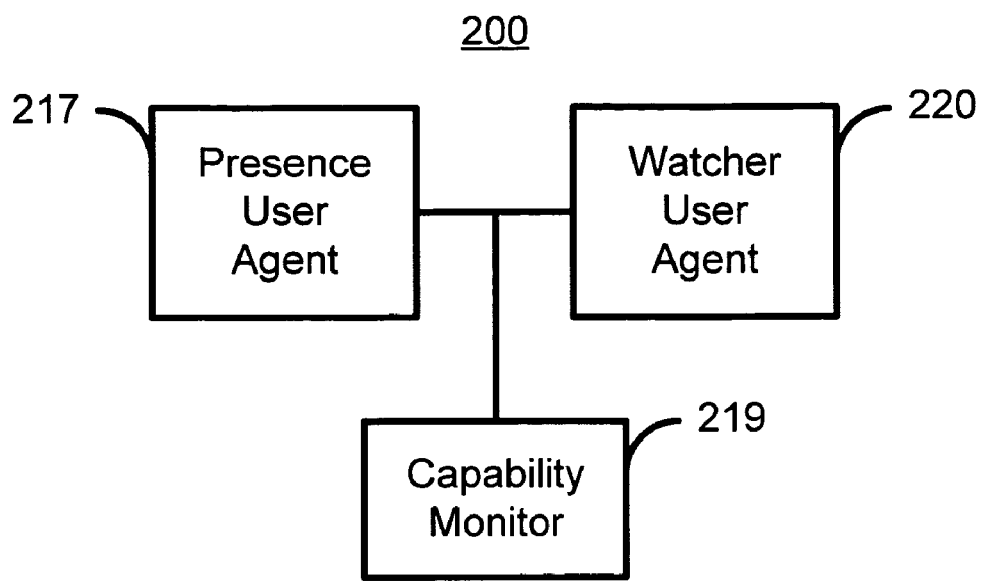
FIG. 4 is a high-level block diagram of one embodiment of a system in accordance with the present invention for providing presence information to a user.

FIG. 4 is a high-level block diagram of one embodiment of a system 200 in accordance with the present invention for providing presence information to a user. The system 200 may be implemented by a device, such as a telephone, digital imaging device, or personal computer. The system 200 includes a presence user agent 217, a watcher user agent 220, and a capabilities monitor 219. The presence user agent 217 communicates with and on behalf of the user. The watcher user agent 220 receives data from the service. The capabilities monitor 219 is preferably used in implementing the methods 100, 110, and 150. In particular, the capabilities monitor 219 can detect changes in the status for the user via the watcher user agent and/or changes activities associated with capabilities of the device. The capabilities monitor 219 also automatically alters the capability of the device if the change in the status is detected and/or is used to automatically alter the status via the presence user agent if the change in the activity is detected. For example, if the activity is changed on the device, the capabilities monitor could contact the presence service using the presence user agent as part of the detection of the change. As a result, the status on other devices, as well as the device 200, can be updated. If a change in status is made, then the capabilities monitor 219 preferably communicates with the presence user agent 217, which contacts the presence service (not shown) with a request to update the user's status. In one embodiment, the capability monitor 219 alters the capabilities of the device by enabling or disabling some portion of the capabilities of the device so that the appropriate capabilities for the status are enabled. In one embodiment, the capabilities monitor 291 also allows the user to specify the capabilities associated with a particular status. Similarly, the capabilities monitor also preferably allows the user to specify a particular status associated with each of at least one activity. Functions of the presence user agent 217, the capabilities monitor 219, and the watcher user agent 220 will also be described below, in FIG. 6.

Figure 5:
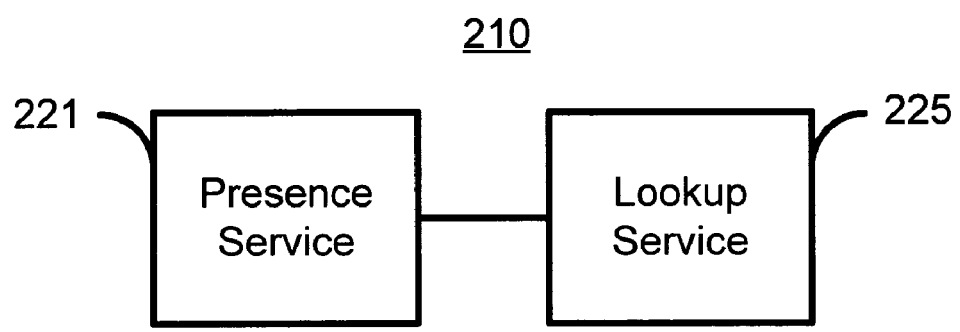
FIG. 5 is a high-level block diagram of one embodiment of a service in accordance with the present invention for providing presence information to a user.

FIG. 5 is a high-level block diagram of one embodiment of a service 210 in accordance with the present invention for providing presence information to a user. The service 210 includes a presence service 221 and a lookup service 225. The presence service 221 and the lookup service 225 may be integrated or independent and may or may not be run on the same server. The presence service 221 communicates with the system 200 of FIG. 4 to receive the necessary information, such as user identification, or requests to change the status of the user. The presence service 221 also provides presence information to the system 200. The lookup service 225 takes address information as input and returns a key for the associated presence tuple. For example, the lookup service 225 would be used to map a phone number to a user name which the presence service 221 would use to retrieve the associated presence tuple. Functions of the presence service 221 and the lookup service 225 will also be described below, in FIG. 6.

Figure 6:
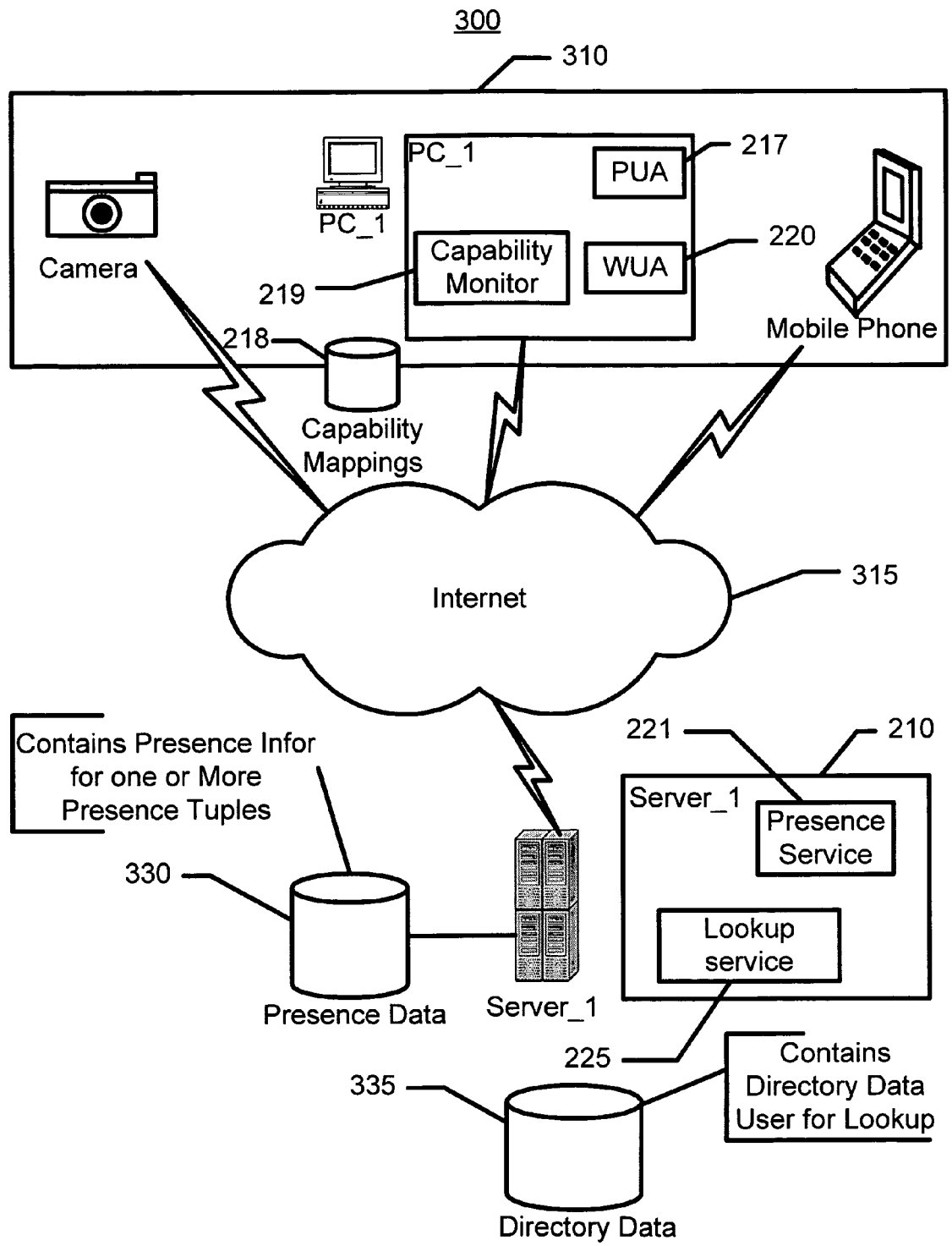
FIG. 6 is a more detailed diagram of the interaction between the system and the service in accordance with the present invention.

FIG. 6 is a more detailed diagram 300 of the interaction between the system 200 and the service 210 in accordance with the present invention. Thus, the systems 200 and 210 of FIGS. 4 and 5, respectively, are depicted in FIG. 6. The system 200 can be implemented in the devices, such as the camera, the mobile phone and the PC, collectively referred to as devices 310. Note that the system 200 could also be implemented using other devices (not shown). For clarity, only the PC is depicted as including the system 200. In addition, a capability monitor 219, which interfaces with capability mappings 218, is also provided. The overall system 300 indicates that activity is provided between the systems 200 and 210 via the internet 315. However, note that another mechanism, including an internal network, might be used.

The service 210 interfaces with the presence data 330 and the directory data 335. The presence data 330 and directory data 335 may be implemented on the same or different databases. The presence data includes presence information, preferably in the form of presence tuples that are preferably indexed using the identity of the corresponding entity (or user). The directory data 335 includes information used in lookups.

In operation, the capability monitor 219, through communication with the presence user agent 217, watcher user agent 220, and the service 210 implements most of the methods 100, 110, and 150. In particular, the watcher user agent 220 can receive user presence information including a user identity for a user, and changes actually made to the user's status. The presence user agent 217 communicates with the user, provides an identification of the user to the service 210, and indicates to the service 210 that an activity related to a recipient is initiated by the user. The watcher user agent 220 receives from the service 210 the status of the user, particularly in response to a notification that the activities on the device have been initiated or changed. Further, the capabilities monitor operates as described above with respect to and depicted in FIG. 3.

Thus, using the system 300, the user's activities, the capabilities of devices, and the presence information are harmonized. Further, the system 300 may be used to perform one or more of the methods 100, 110, and 150. Consequently, the benefits of the methods 100, 110, and 150 may be achieved.

A method and system for harmonizing presence information with device capabilities and user activities has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable storage medium, such as memory, CD-ROM and the like, and executed by a processor. Accordingly, many modifications may be made by one of ordinary skill in the art without departing from the spirit and scope of the appended claims.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash) memory); optical storage devices, including a portable compact disc (CD), a portable digital video disc (DVD), and the like.

I claim:

1. A method for utilizing presence information with a device, the method comprising:
   receiving over a network, by a presence service on a server, a communication indicating a change to a user activity from a second device operated by a user;
   maintaining on the server, by the presence service, a presence status associated with the user activity specified by the user;
   automatically changing, by the presence service, an existing presence status of the user to the presence status associated with the user activity for the user of a first device in response to the received change to the user activity; and
   informing, by the presence service over the network, the first device of the changing of the existing presence status for the first device to automatically enable or disable a capability of the first device based on the changing of the existing presence status and based on a stored indication from the user on how the capability is to be altered.

2. The method of claim 1 wherein the first device has a plurality of capabilities and a portion of the capabilities is associated with a first presence status of the user of the first device, and wherein changing the presence status of the user for the first device includes changing an existing presence status of the user for the first device to the first presence status.

3. The method of claim 2 wherein when the existing presence status of the user for the first device is changed to the first presence status, at least one capability of the portion of the plurality of capabilities associated with the first presence status is enabled or disabled in the first device.

4. The method of claim 2 wherein the portion of the capabilities to be associated with the first presence status of the user is configurable by the user.

5. The method of claim 1 further comprising:
   receiving a request from one of the first device and the second device to update the presence status of the user for the first device.

6. A method for utilizing presence information with a device having at least one capability, the method comprising:
   allowing a user to associate the at least one capability with a particular presence status of the user for the device and associate the particular presence status to an activity specified by the user;
   providing an indication for each capability of the at least one capability whether each capability is to be enabled or disabled when an existing presence status of the user for the device is the particular presence status;
   obtaining, by a first application, from a presence service on a server, a presence status and detecting that the presence status of the user for the device is the particular presence status; and
   automatically enabling or disabling, by the second application, each capability of the at least one capability associated with the particular presence status of the device according to the provided indication when the first application detects that the presence status of the user is the particular presence status.

7. A computer-readable storage medium containing a program, executable by a machine, for utilizing presence information with a device, the program including executable instructions for:
   receiving over a network by a presence service on a server, a communication indicating a change to a user activity from a second device operated by a user;
   maintaining on the server, by the presence service, a presence status associated with the user activity specified by the user;
   automatically changing, by the presence service, an existing presence status of the user to the presence status associated with the user activity for the user of a first device in response to the received change to the user activity; and
   informing, by the presence service over the network, the first device of the changing of the existing presence status for the first device to automatically enable or disable a capability of the first device based on the changing of the existing presence status and based on a stored indication from the user on how the capability is to be altered.

8. The computer-readable storage medium of claim 7 wherein the program includes executable instructions for:
   receiving a request from one of the first device and the second device to update the presence status of the user for the first device, the request based on the indication indicating that the user is performing the activity using the second device.

9. A system for allowing a device having at least one capability to utilize presence information, the system comprising:
   a processor for executing a presence user agent and a capability monitor;
   the presence user agent for communicating with a user and for communicating with a presence service on behalf of the user;
   the capability monitor for allowing a user to associate the at least one capability with a particular presence status of the user for the device, associate the particular presence status to an activity specified by the user, and to provide an indication for each capability of the at least one capability whether the each capability is to be enabled or disabled in response to detecting by a watcher user agent that a presence status of the user for the device is the particular presence;
   the watcher user agent for obtaining presence information from the presence service on a server including the presence status of the user; and
   wherein the capability monitor is further configured for automatically enabling or disabling each capability of the at least one capability of the device according to the provided indication when the watcher user agent detects that the presence status of the user is the particular presence status.

10. The system of claim 9 wherein the presence user agent is further configured to send a request to the presence service to update the presence status of the user for the first device.
    automatically enabling or disabling a first portion of the plurality of capabilities such that the portion of the plurality of capabilities associated with the particular status.

11. A system for utilizing presence information with a device, the system comprising:

a presence service and a processor on a server, the presence service configured for exchanging presence information with first and second devices of a user via a network and is configured to:
maintain on the server a presence status associated with a user activity specified by the user;
receive over the network a communication from a second device indicating a change to the user activity;
automatically change an existing presence status of the user to the presence status associated with the user activity for the user of a first device in response to the received change to the user activity; and
inform, over the network, the first device of the changing of the presence status for the first device to enable or disable a capability of the first device based on the presence status and based on a stored indication from the user on how the capability is to be altered.

12. The system of claim 11, comprising:
a lookup service, operatively coupled to the presence service, the lookup service configured to:
receive from the presence service, information associated with the received indication of the user activity; and
determine a presence tuple including presence information for the user from the information associated with the received indication of the user activity.

13. The system of claim 11, wherein the presence service is configured to receive a request from one of the first device and the second device to update the presence status of the user for the first device, the request based on the indication indicating that the user is performing the user activity using the second device.

14. A computer-readable storage medium containing a program, executable by a machine, for utilizing presence information with a device having at least one capability, the program including executable instructions for:
allowing a user to associate the at least one capability with a particular presence status of the user for the device and allowing the user to associate the particular presence status to an activity specified by the user;
providing an indication for each capability of the at least one capability whether each capability of the at least one capability is to be enabled or disabled when an existing presence status of the user for the device is the particular presence status;
obtaining by a first application from a presence service on a server, a presence status and detecting that the presence status of the user for the device is the particular presence status; and
automatically enabling or disabling, by a second application, each capability of the at least one capability of the device according to the provided indication when the first application detects that the presence status of the user is the particular presence status.

15. A method for utilizing presence information with a device, the method comprising:
receiving over a network, from a first device by a presence service on a server, a presence status of a user of the first device;
receiving over the network, by the presence service on the server, a communication indicating a change to an activity from a second device operated by a user;
maintaining on the server, by the presence service, a presence status associated with the activity specified by the user;
automatically changing by the presence service, an existing presence status of the user to the presence status associated with the activity for the user of the first device in response to the received change to the activity; and
informing, by the presence service over the network, the first device of the changing of the existing presence status of the user for the first device to automatically enable or disable a capability of the first device based on the changing of the existing presence status and based on a stored indication from the user on how the capability is to be altered.

16. The method of claim 15 wherein the first device has a plurality of capabilities and a portion of the plurality of capabilities is associated with a first presence status of the user for the first device, and wherein changing the presence status of the user for the first device includes changing an existing presence status of the user for the first device to the first presence status.

17. The method of claim 16 wherein when the existing presence status of the user for the first device is changed to the first presence status, at least one capability of the portion of the plurality of capabilities associated with the first presence status is enabled or disabled in the first device.

18. The method of claim 16 wherein the portion of the capabilities to be associated with the first presence status of the user is configurable by the user.

19. The method of claim 15 further comprising receiving a request from one of the first device and the second device to update the presence status of the user for the first device.

* * * * *

UNITED STATES PATENT AND TRADEMARK OFFICE
CERTIFICATE OF CORRECTION

PATENT NO.         : 7,593,984 B2
APPLICATION NO.    : 10/903576
DATED              : September 22, 2009
INVENTOR(S)        : Robert P. Morris Page 1 of 1

It is certified that error appears in the above-identified patent and that said Letters Patent is hereby corrected as shown below:

Column 10, line 46, the word, "the" should be removed;

Column 10, line 62-65, the phrase, "automatically enabling or disabling a first portion of the plurality of capabilities such that the portion of the plurality of capabilities associated with the particular status." should be removed; and, Column 12, line 9, the phrase, "service on a server" should read --service on the server--.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,593,984 B2 | Page 1 of 1 |
| APPLICATION NO. | : 10/903576 | |
| DATED | : September 22, 2009 | |
| INVENTOR(S) | : Morris | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this
Twenty-ninth Day of December, 2015

Michelle K. Lee
*Director of the United States Patent and Trademark Office*